(12) United States Patent
Okimoto et al.

(10) Patent No.: US 8,765,292 B2
(45) Date of Patent: Jul. 1, 2014

(54) SEALING BODY FOR A SEALED CELL, AND A SEALED CELL USING THE SEALING BODY

(75) Inventors: Ryota Okimoto, Akashi (JP); Hironori Marubayashi, Sumoto (JP)

(73) Assignee: SANYO Electric Co., Ltd., Moriguchi-shi (JP)

(*) Notice: Subject to any disclaimer, the term of this patent is extended or adjusted under 35 U.S.C. 154(b) by 124 days.

(21) Appl. No.: 13/142,345

(22) PCT Filed: Dec. 24, 2009

(86) PCT No.: PCT/JP2009/071481
§ 371 (c)(1),
(2), (4) Date: Jun. 27, 2011

(87) PCT Pub. No.: WO2010/074169
PCT Pub. Date: Jul. 1, 2010

(65) Prior Publication Data
US 2011/0269014 A1 Nov. 3, 2011

(30) Foreign Application Priority Data
Dec. 26, 2008 (JP) .................. 2008-334649

(51) Int. Cl.
*H01M 2/00* (2006.01)
*H01M 2/04* (2006.01)
*H01M 2/02* (2006.01)
*H01M 2/08* (2006.01)
*H01M 2/10* (2006.01)

(52) U.S. Cl.
USPC ........... 429/179; 429/163; 429/175; 429/180; 429/185; 429/186

(58) Field of Classification Search
None
See application file for complete search history.

(56) References Cited

U.S. PATENT DOCUMENTS

| 6,573,000 | B1 | 6/2003 | Miyazaki et al. | |
|---|---|---|---|---|
| 2001/0004505 | A1* | 6/2001 | Kim et al. | 429/180 |
| 2003/0194609 | A1* | 10/2003 | Nam et al. | 429/181 |
| 2005/0095502 | A1 | 5/2005 | Sugimune et al. | |
| 2009/0004561 | A1* | 1/2009 | Nansaka et al. | 429/185 |

FOREIGN PATENT DOCUMENTS

| CN | 1604356 A | 4/2005 |
|---|---|---|
| JP | 11-086809 A | 3/1999 |
| JP | 11086809 * | 3/1999 |

(Continued)

OTHER PUBLICATIONS

International Search Report for PCT/JP2009/071481, mailed on Mar. 23, 2010.

*Primary Examiner* — Ula C Ruddock
*Assistant Examiner* — Matthew Van Oudenaren
(74) *Attorney, Agent, or Firm* — Westerman, Hattori, Daniels & Adrian, LLP

(57) ABSTRACT

[Problem]
There is provided a sealed cell with no possibility of liquid leakage without sacrificing volume energy density.
[Measures to solve the problem]
The sealing body is characterized as follows: the sealing body for a sealed cell comprises a substantially rectangular-shaped sealing plate having a through hole and/or a thinner portion that is thinner than other portions, and an electrode external terminal attached to the through hole and/or the thinner portion; and the periphery of the sealing body in the vicinity of the terminal plate is thicker than other portions. The thicker portion is 0.1 to 0.4 mm thicker than the other portions, and the width of the thicker portion is preferably 0.1 to 0.5 mm.

8 Claims, 4 Drawing Sheets

(56) References Cited

FOREIGN PATENT DOCUMENTS

| | | |
|---|---|---|
| JP | 2000-268781 A | 9/2000 |
| JP | 2003-317678 A | 11/2003 |
| JP | 2003-346742 A | 12/2003 |
| JP | 2004-178820 A | 6/2004 |
| JP | 2005-129488 A | 5/2005 |
| JP | 2008-251474 A | 10/2008 |
| JP | 2009-026707 * | 2/2009 |

* cited by examiner (a)

(b)

(a)

(b)

(a)

(b)

SEALING BODY FOR A SEALED CELL, AND A SEALED CELL USING THE SEALING BODY

TECHNICAL FIELD

The present invention relates to a sealed cell, more particularly to an improvement of a sealing body for a sealed cell to improve impact resistance.

BACKGROUND

A sealed cell using a prismatic outer can are widely used as a driving power source for various electronic devices because it is easy to be implemented inside of the space in electronic devices.

Such a kind of prismatic sealed cell is fabricated as follows: an electrode assembly and an electrolyte having positive and negative electrodes are housed in a prismatic outer can; a sealing body is fitted in the opening of the prismatic outer can; and the opening of the prismatic outer can is sealed by laser-welding the fitted portion.

When external pressure is applied to the sealing body of the prismatic sealed cell, the stress tends to be concentrated in the center of the sealing body. Thereby, the problem is caused that this stress largely deforms the center of the sealing body, and the laser weld in the vicinity of the center of the sealing body is destroyed, leading to a leakage of the electrolyte. In a design of the prismatic sealed cell, an electrode external terminal is provided in the center of the sealing body in many cases. For the purpose of setting the electrode external terminal in the center of the sealing body, there may be provided a through hole and/or a thinner portion that is thinner than other portions. Since the through hole and the thinner portion have weak strength, the problem described above is more likely to be caused.

A technique regarding sealed cells is disclosed, for example, in the following Patent Document 1.
[Patent Document 1]
Japanese Patent Application Publication No. 2000-268781

Patent Document 1 discloses a technique using a sealing body in which a step portion, which is more recessed in the thickness direction in the central side than the periphery of, is formed along the periphery on the outer surface of the cell. The document describes that this technique reduces irradiation energy of a laser beam as much as possible when laser welding is carried out, and thereby the occurrence of cracks can be suppressed.

However, this technique cannot sufficiently suppress destruction of the laser weld due to stress.

DISCLOSURE OF INVENTION

Problems to be Solved by the Invention

In view of the above problem, the present invention aims to provide a sealing body for a sealed cell that may suppress destruction of the laser weld due to stress, and a sealing cell using the sealing body.

Means for Solving the Problems

The present invention of the sealing body for a sealed cell to solve the above problems is characterized as follows: the sealing body for a sealed cell comprises a substantially rectangular-shaped sealing plate having a through hole and/or a thinner portion that is thinner than other portions, and an electrode external terminal attached to the through hole and/or the thinner portion; and the periphery of the sealing body in the vicinity of the electrode external terminal is thicker than other portions of the periphery of the sealing body.

In this structure, a thicker portion is provided in the sealing body at the vicinity of the electrode external terminal. The strength of the thicker portion is greater than that of other portions of the periphery of the sealing body, and the thicker portion acts so as to reduce the stress when a shock is applied. Thus, the deformation degree due to stress becomes smaller, destruction of laser weld is inhibited, and thereby liquid leakage is less likely to occur.

In addition, the thicker portion is provided at the periphery of the sealing body, which does not interrupt the space including members to be implemented more internally than the sealing body. Therefore, there is no possibility of a decrease in volumetric energy density.

As used herein, the vicinity of the electrode external terminal means the range including the electrode external terminal and the outside thereof having the length $L2=1$ to $1.5 \times L1$ wherein $L1$ is the length of the electrode external terminal $10$, as shown in FIG. 4.

Meanwhile, when the length of the thicker portion is shorter than the length $L1$ of the electrode external terminal, or is longer than 1.5 times of $L1$, the stress cannot be sufficiently reduced.

Preferably, the thicker portion is 0.1 to 0.4 mm thicker than the other portions of the periphery of the sealing body, and the width of the thicker portion is 0.1 to 0.5 mm.

The periphery of the sealing body (the two long sides of the sealing plate) in the vicinity of the electrode external terminal provides effects even when only one side is thicker, but the effects are larger when both sides are thicker. Also, in case of increasing the thicknesses of both sides, each increase in the thickness and each width of the thicker portions are preferably equal.

In the above configuration, a raised portion raised toward the outside of the cell may be formed at the periphery of the cell outer side of the sealing plate, while a step portion that is opposite to the raised portion may be formed at the periphery of the cell inner side of the sealing plate in the region other than the vicinity of the electrode external terminal. In addition, the step portion may not be formed at the periphery of the cell inner side of the sealing plate in the vicinity of the electrode external terminal.

In the above configuration, the raised portion raised toward the outside of the cell is formed at the periphery of the cell outer side of the sealing plate, and this raised portion makes heat hard to escape during laser welding, thus allowing to prevent laser weld failure. In order to form this raised portion, it is a convenient method to perform forge processing so that the periphery of the sealing plate may be pressed up from the inside of the cell. According to this method, a step portion is formed on the cell inner side of the sealing plate at the part opposite to the raised portion. By preventing the step portion from being formed, for example filling the step portion, at the periphery of the cell inner side of the sealing plate in the vicinity of the electrode external terminal, it is possible to increase the thickness of the part without sacrificing space in the cell.

In the above configuration, a filled portion protruding to the inside of the cell may be formed at the periphery of the cell inner side of the sealing plate in the vicinity of the electrode external terminal.

By forming the filled portion protruding to the inside of the cell at the periphery of the cell inner side of the sealing plate in the vicinity of the electrode external terminal, it is possible to easily increase the thickness of the part.

The present invention of a sealed cell to solve the above problems relates to a sealed cell that uses the sealing body for a sealed cell having the above-described structure.

Effect of the Invention

According to the present invention, it is possible to provide, in high productivity, a sealed cell with improved weld strength between the sealing plate and the outer can and with no possibility of liquid leakage.

BRIEF DESCRIPTION OF THE DRAWINGS

FIG. 3(a) is a plan view, and FIG. 3(b) is a cross-sectional view along the A-A line in FIG. 3(a).

FIG. 5(a) shows the vicinity of the electrode external terminal, and FIG. 5(b) shows the other regions.

FIG. 6(a) shows the sealing body according to the present invention, and FIG. 6(b) shows a conventional sealing body.

MODES FOR CARRYING OUT THE INVENTION

Embodiment

Figure 1:
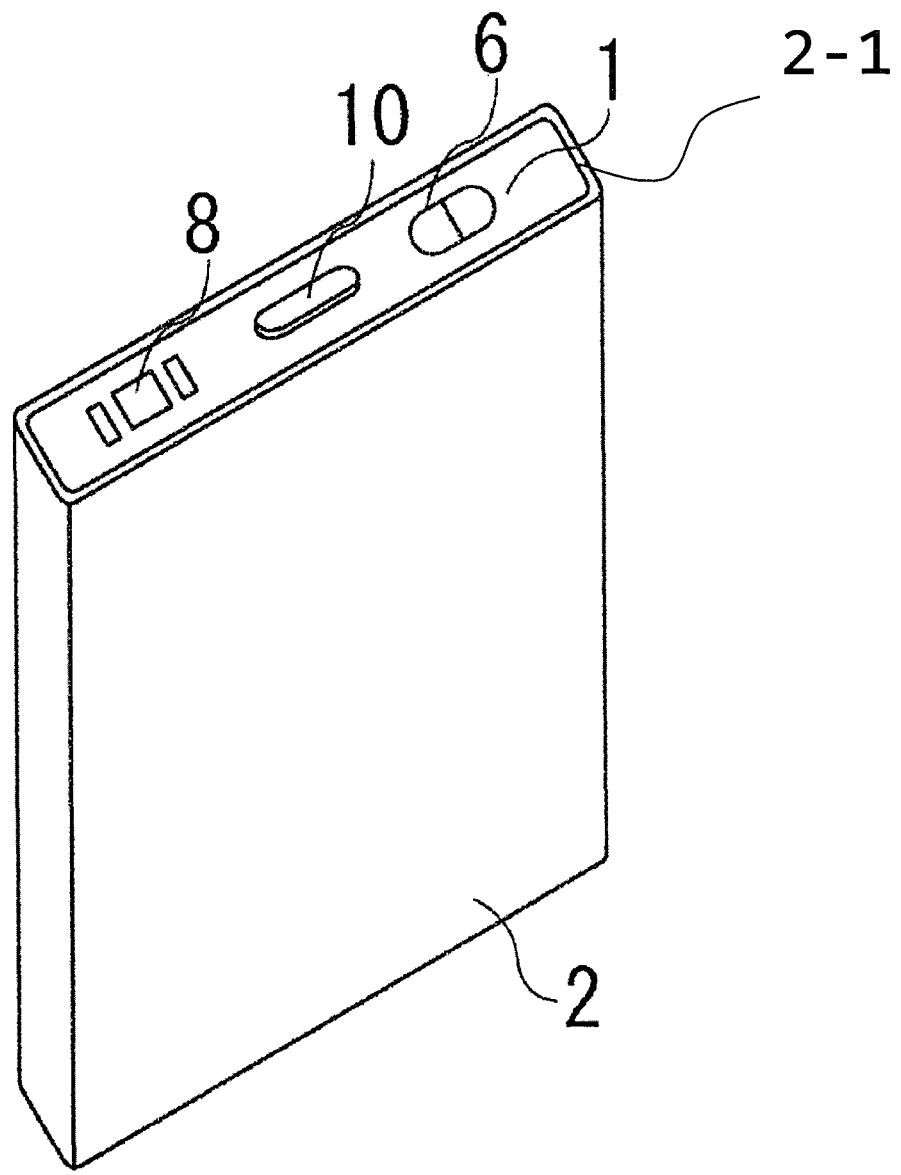
FIG. 1 is a perspective view showing the sealed cell according to the present invention.
Figure 2:
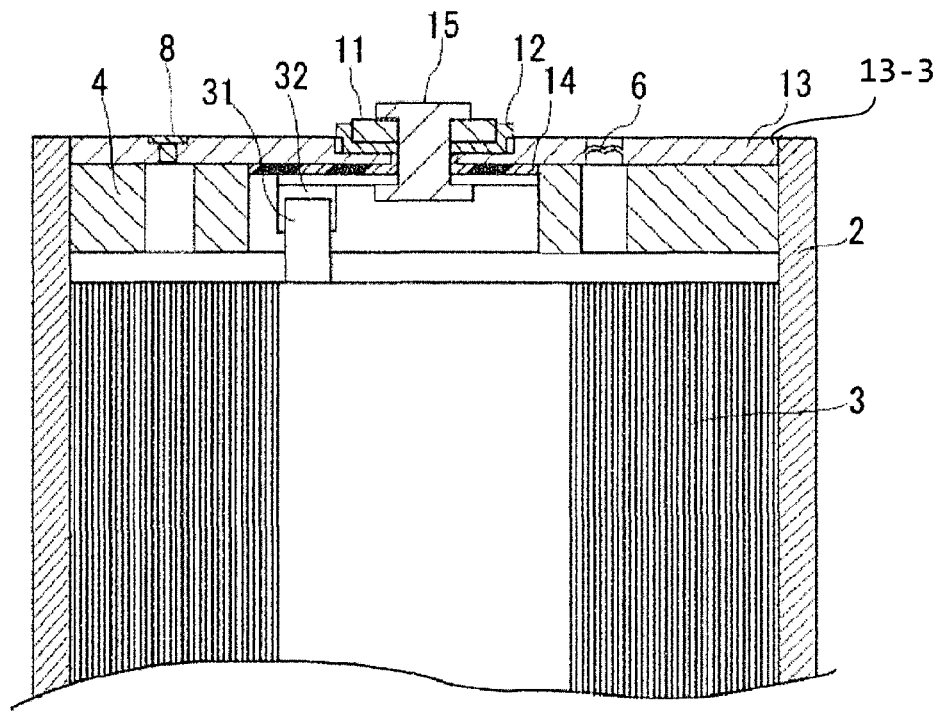
FIG. 2 shows a cross-sectional view of the sealed cell according to the present invention.
Figure 3:
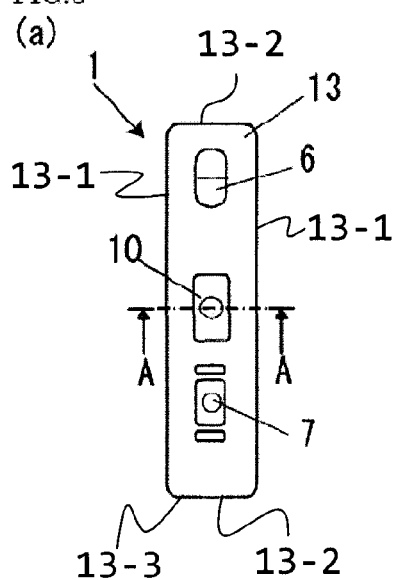
FIG. 3 is a diagram showing the sealing body according to the present invention.
Figure 3:
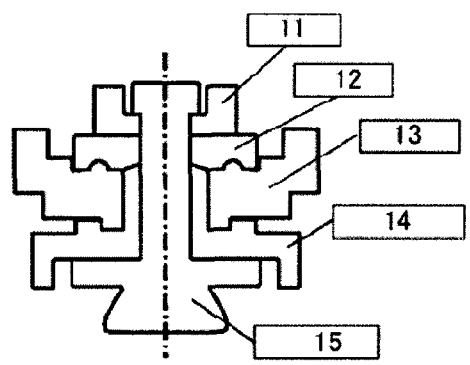
Figure 4:
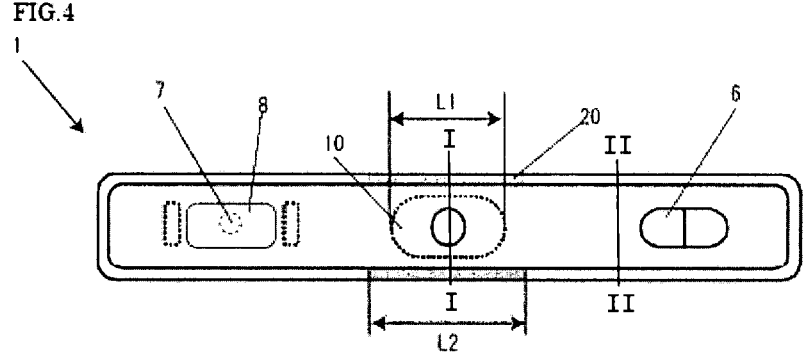
FIG. 4 shows a transparent plan view of the sealing body according to the present invention.
Figure 5:
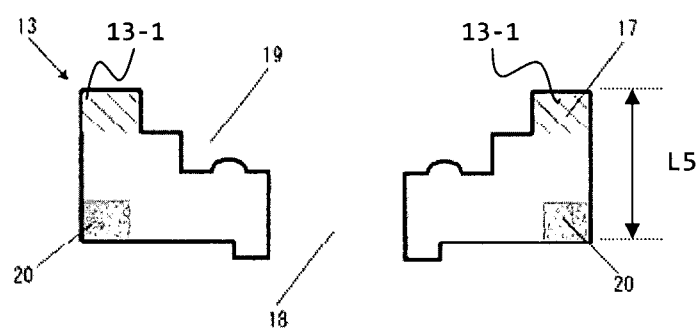
FIG. 5 is a cross-sectional view of the sealing plate used in the sealing body according to the present invention.
Figure 5:
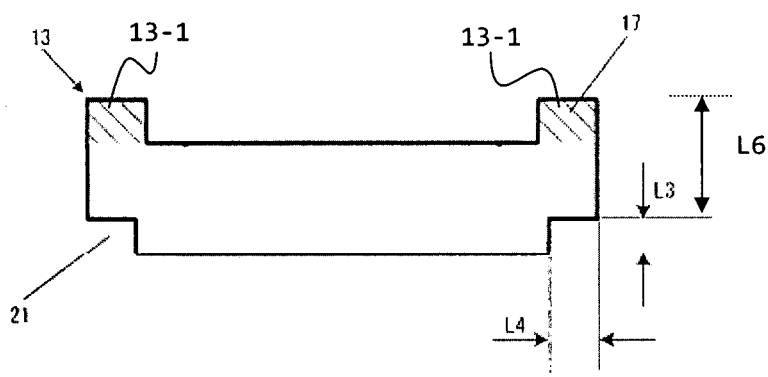

The modes for carrying out the present invention will be described below using the example in which the present invention is applied to a non-aqueous electrolyte secondary cell with reference to the drawings. FIG. 1 is a perspective view showing the sealed cell according to the present invention. FIG. 2 is a cross-sectional view of the sealed cell according to the present invention. FIG. 3 is a diagram showing the sealing body according to the invention. FIG. 3 (a) is a plan view, and FIG. 3 (b) is a cross-sectional view along the A-A line in FIG. 3(a). FIG. 4 is a transparent plan view of the sealing body according to the present invention. And FIG. 5 is a sectional view of the sealing plate.

As shown in FIG. 1, the sealed cell according to the present invention is formed by fitting the sealing body 1 into the opening 2-1 of the outer can 2 and then by sealing the fitted portion using laser welding. In addition, as shown in FIG. 4, the sealing body 1 for a sealed cell according to the present invention has a safety valve 6 from which inner gas may be discharged outside of the cell when the cell inner pressure is abnormally elevated, a liquid injection hole 7 for injecting an electrolyte into the outer can 2, and an electrode external terminal 10. As shown in FIGS. 2 and 4, the liquid injection hole 7 is sealed with a sealing plug 8 having a retainer plate and a protrusion. The safety valve 6, liquid injection hole 7 and sealing plug 8 are not essential components of the present invention.

As shown in FIG. 3(b), the sealing body 1 for a sealed cell according to the present invention comprises a sealing plate 13, a terminal plate 11, an insulation gasket 12, a terminal rivet 15 and an insulation plate 14. The sealing body 1 has a structure in which the terminal plate 11 and terminal rivet 15 are fixed to the sealing plate 13 by caulking the insulation gasket 12 and the insulation plate 14. The electrode external terminal 10 comprises the terminal rivet 15, the terminal plate 11 involved in taking out electric current, and the insulation plate 14 and the insulation gasket 12 for fixing the terminal rivet 15 and the terminal plate 11. In case of a plan view of the sealing body 1, since the terminal plate 11 is mainly prominent, the length of the electrode external terminals 10 (cf. FIG. 3(a)) is equal to that of the terminal plate 11.

As shown in FIG. 2, an electrode assembly 3 having positive and negative electrodes is housed in the outer can 2, and an insulation material 4 is disposed between the electrode assembly 3 and the sealing body 1, which are insulated via the insulation material 4. In addition, the electrode assembly 3 is connected to the terminal plate 11 via a current collector tab 31, a lead 32 and the terminal rivet 15, and thereby electric current is extracted outside.

As shown in FIG. 5, a raised portion 17 raised toward the outside of the cell is formed at the periphery of the cell outer side (the upper side in FIG. 5) of the sealing plate 13. Moreover, in the region other than the vicinity of the electrode external terminal, a step portion 21 is formed at the part opposite to the raised portion (cf. FIG. 5 (b)). Meanwhile, in the vicinity of the electrode external terminal, a filled portion 20 is formed which fills the step portion and thereby increases the thickness of the part (cf. FIG. 5 (a)). In addition, a thinner portion 19 and a through hole 18 for mounting the electrode external terminal are formed in the sealing plate 13.

The raised portion 17, i.e. the periphery raised toward the outside of the cell, is provided in order to make heat hard to escape during the laser welding, but the raised portion 17 is not an essential component of the present invention. However, in order to form the raised portion 17, forging processing is performed so that the region opposite to the raised portion in the back surface of the sealing plate 13 is pressed up, and thereby the step portion 21 is formed at the part opposite to the raised portion 17. Since the filled portion 20 can be formed by utilizing (filling) this step portion 21, it is possible to effectively utilize the space inside the cell.

Here, the length L1 of the electrode external terminal 10 is 6 mm, the length L2 of the region where the filled portion 20 is formed is 8 mm (1.33×L1). The thickness and the width of the filled portion 20 are respectively equal to the depth L3 and width L4 of the step portion 21, i.e. L3=0.2 mm and L4=0.25 mm (cf. FIG. 5).

As a material of the sealing body 1, it is preferred to use aluminum materials (pure aluminum and aluminum alloys) having light weight and excellent formability. As aluminum alloys, an Al—Mn alloy is particularly preferable.

As illustrated in FIGS. 2 and 3, the sealed cell has a substantially rectangular-shaped sealing plate 13 having two long sides 13-1, 13-1 and two short sides 13-2, 13-2 at a periphery 13-3 of the sealing plate 13. The sealing plate 13 has a through hole 18. See FIG. 5. As illustrated in FIG. 2, the periphery 13-3 of the sealing plate 13 is directly attached to the opening 2-1 of the outer can 2. The sealed cell has an electrode external terminal 10 attached to the through hole 18. See FIGS. 2 and 5. The periphery 13-3 at both of the long sides 13-1 of the sealing plate, opposing to each other via the electrode external terminal 18, is thicker than other portions of the periphery of the sealing plate.

FIG. 4 shows lines I-I and II-II. The line I-I in FIG. 4 corresponds to line A-A in FIG. 3(a). As illustrated in FIGS. 4 and 5(a), the periphery 13-3 at both of the long sides 13-1 of the sealing plate, opposing to each other via the electrode external terminal 18, (i.e., the periphery on the line I-I in FIG. 4), is thicker than other portions of the periphery of the sealing plate (i.e., the periphery on the line II-II). The thickness on the periphery on the line I-I is L5, whereas the thickness on the periphery on the line II-II is L6. In FIGS. 5(a) and 5(b), a relationship of L5=L6+L3 is met.

The following describes a method for fabricating the sealed cell according to the present invention.

<Preparation of Positive Electrode>

Nine parts by mass of $LiCoO_2$ powder with the average diameter of 5 µm as a positive electrode active material is mixed with 1 part by mass of artificial graphite powder as a conductive agent to prepare a positive electrode mixture. This positive electrode mixture is kneaded with a binder solution in which a polyvinylidene fluoride is dissolved into N-methyl-2-pyrrolidone (NMP) in the concentration of 5 mass % so that solid mass ratio after drying may be as follows:

the positive electrode mixture:polyvinylidene fluoride=95:5.

Thus, a positive active material slurry is prepared.

This slurry is coated on both sides of an aluminum foil (foil thickness: 15 µm) as a positive electrode current collector. In this case, the coating on both sides is applied at 500 $g/m^2$ based on dried mass (coated on each side at 250 $g/m^2$, excluding the current collector), and the plate is dried and pressed to prepare a positive electrode plate having a filling density of the positive electrode active material of 3.7 g/ml. Then, after the plate is cut so as to fit the height of the cell, a current collector tab is attached to complete a positive electrode.

<Preparation of Negative Electrode>

Scale-like natural graphite (d002 value: 3.356 Å; Lc value: 1000 Å; average particle size: 20 µm) and dispersions (solid content: 48%) of styrene-butadiene rubber (SBR) is dispersed in water, and then carboxymethylcellulose (CMC) as a thickener is added thereto to prepare a negative active material slurry. The dried solid mass composition ratio is prepared so that, for example, the graphite:SBR:CMC=100:3:2.

This slurry is applied on both sides of a copper foil (foil thickness: 10 µm) as a negative electrode current collector at 200 $g/m^2$ based on dried mass (coated on each side at 100 $g/m^2$, excluding the current collector). Then, the plate is dried and pressed to prepare a negative electrode plate having a filling density of the negative electrode active material of 1.7 g/ml. Then, after the plate is cut so as to fit the height of the cell, a current collector tab is attached to complete a negative electrode.

<Fabrication of the Electrode Assembly>

The above positive and negative electrodes are wound via a separator made of a microporous polyethylene membrane, and then pressed to fabricate a flat spiral electrode assembly 3.

<Preparation of the Electrolyte Solution>

$LiPF_6$ is resolved into a mixture solvent containing ethylene carbonate (EC) and diethyl carbonate (DEC) in the volume ratio of 50:50 (25° C.) so that a concentration of $LiPF_6$ may be 1 mol/l, thus preparing an electrolyte solution.

<Fabrication of the Sealing Body>

A sealing plate 13 provided with a safety valve 6 and a liquid injection hole 7 is fabricated using a known method. The periphery of the sealing plate 13 is raised by forge processing to form a raised portion 17. Thereby, a step portion 21 is formed at the part opposite to the raised portion 17. Thereafter, there is formed a concave thinner portion 19 for fixing a terminal plate 11. In forming the thinner portion 19, the material of the sealing plate is pressed so as to spread to the step portion 21 in the vicinity of the thinner portion 19, and thus the step portion 21 is filled to form a filled portion 20. Then, a through hole 18 for a terminal rivet is made by means of punching. Thereafter, an insulation gasket 12 and an insulation plate 14 are caulked, and thereby the terminal plate 11 and the terminal rivet 15 are fixed to the sealing plate 13, thus obtaining the sealing body 1.

<Cell Assembly>

Current collector tabs respectively attached to the positive and negative electrodes of the electrode assembly 3 connect a negative electrode current collector tab 31 and a terminal rivet 15 via a lead 32. After this electrode assembly is inserted into a prismatic bottomed outer can 2 made of aluminum alloy, a positive electrode collector tab is interposed between the outer can 2 and the sealing body 1. Thereafter, the sealing body 1 and the opening of the outer can are laser welded, and the electrolyte is injected into an injection hole 7 of the sealing body 1. Then, the injection hole 7 is sealed with a sealing plug 8 having a retainer plate and a protrusion, and the sealing plate 13 is laser welded to the periphery of the retainer plate of the sealing plug 8 to fabricate a nonaqueous electrolyte secondary cell according to this Embodiment. The current collector tab connected to the terminal rivet 15 may be disposed on the positive electrode side, and the current collector tab connected to the outer can 2 may be disposed on the negative electrode side.

(Test Cell 1)

Test cell 1 was fabricated according to the foregoing Embodiment except that the electrode assembly and the electrolyte are not used.

Test cell 2 was fabricated in a similar way to Test cell 1 except that the sealing body not having the filled portion is used.

[Measurement of Push-in Strength (Weld Strength)]

Similarly to the above, five Test cells 1 and five Test cells 2 were prepared. A jig whose tip has a diameter of 3 mm is pressed against the terminal plate 11 of each test cell, and thereby the strength when the weld was broken (weld strength) was measured. The results are shown in Table 1 below. The number of the test samples is five.

TABLE 1

|  | Test Cell 1 | Test Cell 2 |
| --- | --- | --- |
| Push-in Strength (N) | 419 (389-446) | 373 (353-392) |

In the above table, the numbers outside the parentheses are the averages, and those in the parentheses are the ranges of measured values.

From Table 1 above, it is found that Test cell 1 having a filled portion 20 has the average push-in strength of 419N, which is larger than that of Test cell 2 not having a filled portion, 373N.

Figure 6:
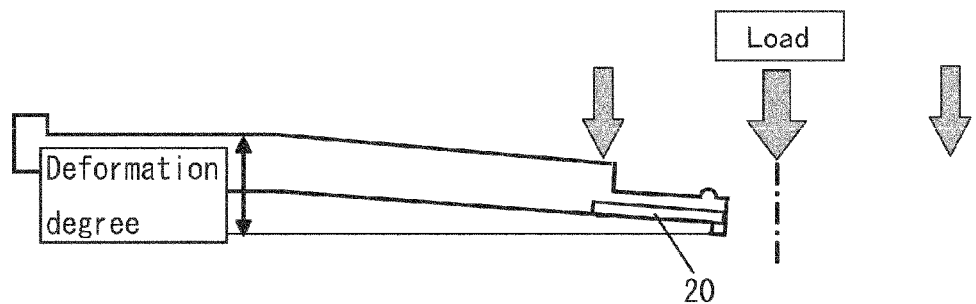
FIG. 6 is a diagram illustrating deformation of the sealing body when a load is applied.
Figure 6:
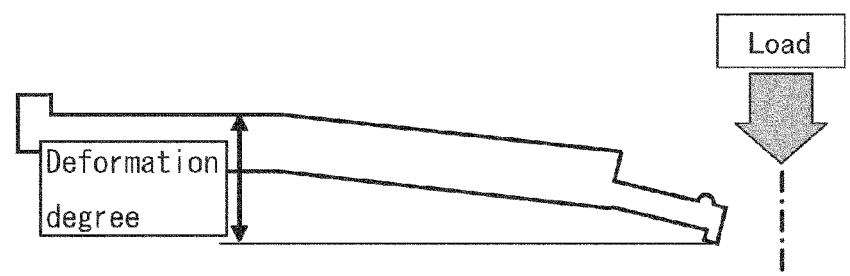

This is considered as follows. When the filled portion 20 is provided on the sealing plate (Test cell 1), the thickness of the part where filled portion 20 is provided is larger than other portions, thereby increasing strength. Since this part having the increased strength is disposed in the vicinity of the electrode terminal in the center of the sealing body where stress tends to be most concentrated, stress applied to this part is distributed, and thereby the push-in strength is improved. Since the conventional sealing body (Test cell 2) does not have this function, deformation degree due to the pushing-in is large, thus lowering the push-in strength (cf. FIGS. 6(a) and (b)).

(Supplementary Remarks)

Figure 7:
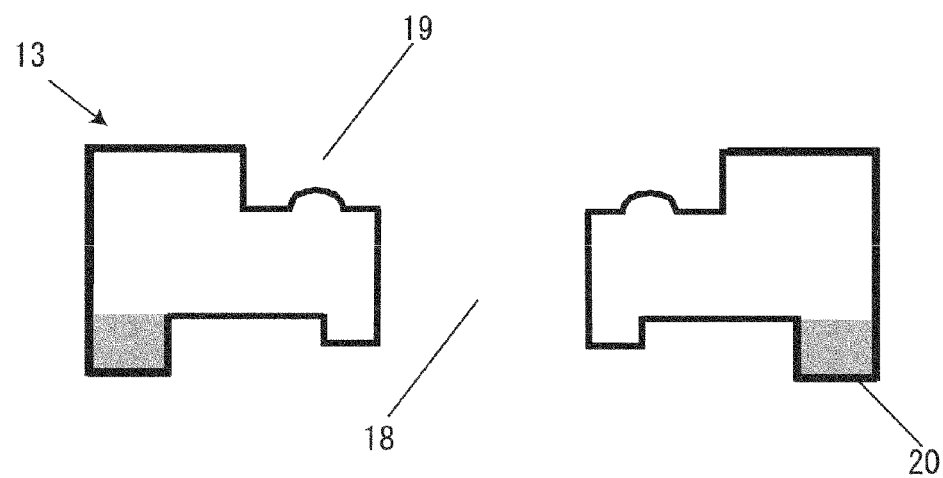
FIG. 7 is a diagram showing another example of the sealing body according to the present invention.

As shown in FIG. 7, in order to increase the thickness of the portion, a filled portion 20 protruding toward the inside of the cell may be provided in place of raising the periphery of the sealing plate 13.

The present invention is applicable to all sealed cells having a prismatic outer can, regardless of a primary or secondary cell.

The Availability of the Industry;

As explained above, according to the present invention, there can be provided a sealed cell with excellent safety and less possibility of electrolyte leakage due to shock of a drop and the like, without impairing volumetric energy density, by forming a filled portion at the periphery in the vicinity of the electrode terminal of the sealing body and thus increasing the thickness. Thus, industrial availability of the present invention is significant.

DESCRIPTION OF THE CODE

1 Sealing body
2 Outer can
3 Electrode assembly
4 Insulation member
6 Safety valve
7 Liquid injection hole
8 Sealing plug
10 Electrode external terminal
11 Terminal plate
12 Insulation gasket
13 Sealing plate
14 Insulation plate
15 Terminal rivet
17 Raised portion
18 Through hole
19 Thinner portion
20 Filled portion
21 Step portion
31 Current collector tab
32 Lead

The invention claimed is:

1. A sealed cell comprising:
   an outer can having an opening;
   a substantially rectangular-shaped sealing plate having two long sides and two short sides at a periphery thereof, the sealing plate having a through hole, the periphery directly attached to the opening; and
   an electrode external terminal attached to the through hole, wherein
   the periphery at both of the long sides of the sealing plate, opposing to each other via the electrode external terminal, and having a length of 1 to 1.5 times a length of the electrode external terminal, is thicker than remaining portions of the two long sides, and the two short sides of the sealing plate at the periphery thereof.

2. The sealed cell according to claim 1, wherein the thicker portion of the periphery of the sealing plate is 0.1 to 0.4 mm thicker than the other portions of the periphery of the sealing plate, and the width of the thicker portion of the periphery of the sealing plate is 0.1 to 0.5 mm.

3. The sealed cell according to claim 1, wherein:
   a raised portion raised toward the outside of the cell is formed at the periphery of the cell outer side of the sealing plate;
   a step portion that is opposite to the raised portion is formed at the periphery of the cell inner side of the sealing plate in the region other than the vicinity of the electrode external terminal; and
   the step portion is not formed at the periphery of the cell inner side of the sealing plate in the vicinity of the electrode external terminal.

4. The sealed cell according to claim 1, wherein a filled portion protruding to the inside of the cell is formed at the periphery of the cell inner side of the sealing plate in the vicinity of the electrode external terminal.

5. The sealed cell according to claim 1, wherein the through hole is provided at a center of the sealing plate.

6. The sealed cell according to claim 1, wherein the sealing plate has a thinner portion near the through hole.

7. The sealed cell according to claim 1, wherein the outer can is prismatic.

8. The sealed cell according to claim 1, wherein in the periphery at both of the long sides, a portion of each of the long sides, opposing to each other via the electrode external terminal, is thicker than other portions of the periphery of each of the long sides.

* * * * *